Feb. 11, 1958 J. I. PANKOVE 2,823,148

METHOD FOR REMOVING PORTIONS OF SEMICONDUCTORS WITH MERCURY

Filed March 2, 1953

INVENTOR.
JACQUES I. PANKOVE
BY J. C. Whittaker
ATTORNEY

United States Patent Office 2,823,148

Patented Feb. 11, 1958

2,823,148

METHOD FOR REMOVING PORTIONS OF SEMI-CONDUCTOR DEVICE ELECTRODES

Jacques I. Pankove, Princeton, N. J., assignor to Radio Corporation of America, a corporation of Delaware Application March 2, 1953, Serial No. 339,683

8 Claims. (Cl. 148—1.5)

This invention relates to the production of novel semi-conductor devices and to improved methods for treating semi-conductor devices.

When a connection has been made to a body of semi-conducting material such as germanium or silicon by soldering, alloying, evaporating, sputtering, diffusing or electroplating some mercury-soluble metal upon the surface of the body, it is sometimes desirable subsequently to remove substantially all of the metal which has not diffused into the crystal lattice of the semi-conductor body.

Previously, such metal has been removed by dissolving it in an acid such as, for instance, hydrochloric acid, that has relatively little effect upon the semi-conducting material. Such methods usually involve a prolonged period of immersion in an acid and, therefore, also involve the risk of producing an undesired effect upon the semi-conductor body itself.

An object of the invention is to provide an improved semi-conductor device.

Another object of the invention is to provide a novel method for removing from the surface of a semi-conducting body, metal that is intimately joined to the surface.

Another object of the invention is to provide an improved method for exposing a re-crystallized region of a semi-conductor device.

Another object of the invention is to provide a semi-conductor device having an improved P–N rectifying junction.

Still another object of the invention is to provide an improved semi-conductor device having improved electrical voltage and frequency characteristics.

The foregoing objects may be attained in accordance with the present invention which provides a method for removing quickly and efficiently substantially all that part of a metal upon the surface of a semi-conducting body, that has not diffused into the body, and for thereafter treating said body to form an improved semi-conductor device.

The invention may be more easily understood by reference to the following detailed description and to the drawing of which:

Similar reference characters have been applied to similar elements throughout the drawing.

According to the invention a mercury-soluble metal that has been soldered, alloyed, diffused, evaporated, sputtered, electroplated or otherwise intimately joined to a surface of a semi-conducting body is dissolved in mercury. The surface of the semi-conducting body is thereafter rinsed in nitric acid for about thirty seconds. The mercury removes substantially all of the metal joined to the surface of the semi-conducting body and the nitric acid serves to remove the small amount of amalgam that may adhere to the surface after the mercury solution has run off.

Further, according to the invention the body treated in the manner described above is heated to a temperature and for a time to provide additional diffusion of the mercury-soluble metal atoms present within the semi-conductor body. Thereafter, electrical connections may be made to the body in order to utilize it in a circuit.

Figure 1:
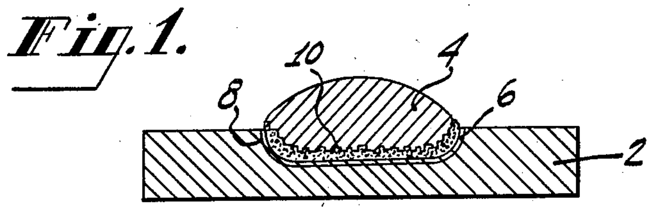
Fig. 1 is a schematized, cross-sectional, elevational view of a device prior to treatment according to the invention.

In a preferred embodiment of the invention, a semi-conductor device as shown in Figure 1 comprising a wafer of semi-conducting germanium 2 having a body of indium 4 fused to one surface thereof, a re-crystallized region 10, and a P–N rectifying junction 8 disposed in close proximity to an alloy front 6, is dipped into a quantity of mercury for about one minute at room temperature. The device is removed from the mercury, shaken lightly and dipped into concentrated nitric acid at room temperature for about thirty seconds. The device is then rinsed in running water and dried. It is found that substantially all of the indium that is not diffused into the germanium has been dissolved by the mercury, and that the small amounts of mercury and amalgam that adhered to the germanium surface upon its removal from the mercury have been removed by the nitric acid. Neither mercury nor nitric acid has any appreciable effect upon germanium, especially during the short immersion times required in the practice of the invention.

Figure 2:
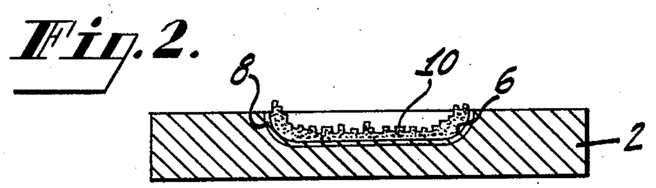
Fig. 2 is a schematized, cross-sectional, elevational view of the device shown in Fig. 1 after treatment according to the invention.

Figure 2 illustrates the body shown in Figure 1 after treatment in the manner described. There is shown a body of germanium 2 having an alloy front 6 and a re-crystallized region 10 which is now exposed for examination or other treatment.

Figure 3:
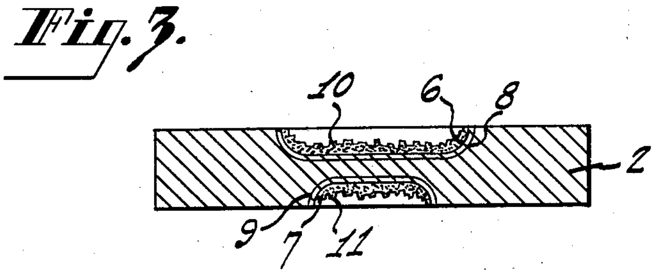
Fig. 3 is a schematized, cross-sectional, elevational view of a device formed according to the invention.

Figure 3 shows a body 2 of germanium having two oppositely disposed P–N rectifying junctions 8 and 9, two alloy fronts 6 and 7, and two re-crystallized regions exposed upon its surface by the process described in connection with Figures 1 and 2. This body is heated in a non-oxidizing atmosphere to about 800° C. for about four hours to permit the indium already diffused within the body to diffuse further. This further diffusion serves to broaden and thicken the P–N rectifying junctions within the body and does so without advancing the alloy fronts into the body.

Thickening and broadening of such a junction is desirable because it serves to reduce the effective electrical capacitance and to increase the "break-down voltage" of the junction, thus permitting satisfactory operation of the junction at higher electrical frequencies and voltages than otherwise.

Figure 4:
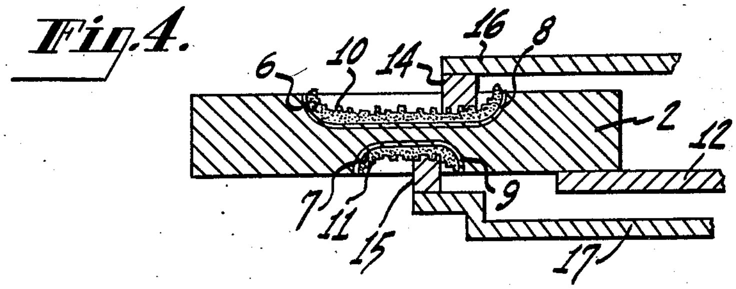
Fig. 4 is a schematized, cross-sectional, elevational view of a semi-conductor device formed according to the invention.

Figure 4 illustrates a semi-conductor device produced according to the present invention and utilizing a germanium body treated in the manner described in connection with Figure 3. Figure 4 shows a body 2 of germanium having two oppositely disposed, thickened P–N rectifying junctions 8 and 9 and two exposed re-crystallized areas 10 and 11. An electrical lead 12 having a tinned surface, or otherwise adapted to form a non-rectifying connection to the germanium body, is placed in contact with the surface of the body. Two pellets 14 and 15 of an alloy consisting of 95% indium and 5% germanium are placed in contact respectively with the two exposed re-crystallized areas, and two electrical leads 16 and 17 are placed in contact respectively with the pellets. The entire assembly is heated at about 400° C. for about five minutes to fuse the adjacently placed parts together. A semi-conductor device is thus formed having two thickened P–N rectifying junctions and being suitable for operation at higher electrical voltages and frequencies than previous devices. The device as described may be encased in a suitable plastic material to facilitate handling and to protect it from light and from mechanical shock.

Although the method described above is preferred for making electrical connections to the device of Figure 3, such connections may alternatively be made by mechanical means alone such as spring contacts of any suitable conventional type. Such connections may give satisfactory results, but a device so connected is apt to exhibit erratic behavior when subjected to mechanical shocks such as vibrations of even a relatively slight amplitude.

The pellets 14 and 15 shown in Figure 4 may be of any suitable low melting point metal or alloy, and may be omitted entirely, provided the lead wires 16 and 17 are coated with a suitable material such as tin. It is only necessary that a good electrical and mechanical contact be made to the recrystallized surface. The heating to accomplish this contact should be at a temperature sufficiently low not to disturb the alloy fronts 6 and 7, and should be high enough to insure good wetting action upon the recrystallized surface by the contacting metal.

In the heating of the device to thicken the P–N rectifying junction subsequent to the removal of indium, the alloy front is not significantly disturbed as would be the case were such heating carried out without removing the indium body.

The practice of the invention is not limited to the particular examples described above. Metals such as indium, tin, lead, bismuth, gold, silver, copper, zinc and gallium are all readily soluble in mercury. Further, all alloys comprising a substantial proportion of the above named metals are also soluble in mercury. Both germanium and sliicon are highly insoluble in mercury so that while mercury dissolves the metals and alloys listed above, it does not even wet a germanium or silicon surface.

Therefore, it will be seen that the practice of the invention is applicable to a wide range of materials. For example, an alloy comprising tin and aluminum or an alloy comprising antimony and lead may readily be removed from the surface of a body of germanium or silicon by the methods described herein. Also, it will be seen that the practice of the invention is useful in the production of semi-conductor devices comprising a wide range of different materials. For example, such a device may comprise a body of germanium having P–N rectifying junctions formed by the diffusion of an alloy of lead and antimony within the body, or may comprise a body of silicon having P–N rectifying junctions formed by the diffusion of indium.

In the practice of the invention, it is not necessary to dip the complete semi-conductor device into a quantity of mercury. If desired, equally satisfactory results may be obtained by placing a relatively small quantity of mercury upon the surface of the metal it is desired to remove. This quantity is somewhat variable and depends upon the degree of solubility of the metal in mercury. Sufficient mercury should be used to dissolve substantially all of the metal. In the case of indium, such a quantity of mercury may be about equal in volume to the volume of the indium it is desired to remove.

When rinsing the semi-conductor surface in nitric acid, the concentration of the nitric acid is not critical. Generally nitric acid in any concentration from about fifty percent by volume to concentrated C. P. will satisfactorily and quickly dissolve substantially all the amalgam and mercury that may adhere to the semi-conductor surface.

In certain instances it is not necessary to rinse the semiconductor surface in nitric acid subsequent to dissolving the removed metal in mercury. This may be the case where it is desired to make use of the adherent amalgam to form an electrical contact with the exposed surface. It may also be, especially in the case of removing metals that have not diffused appreciably into the semi-conductor body, that no mercury or amalgam will adhere to the newly exposed surface. In this instance also, the acid rinse is not needed.

It should be understood that the thickening of a P–N rectifying junction by heating, as described particularly with reference to Figure 3 is dependent on the time of heating and the temperature. For example, a relatively short time such as about ten minutes at a relatively high temperature will produce a significant thickening of a P–N rectifying junction, or a comparable thickening may be produced by heating at a relatively low temperature for a relatively prolonged time, even up to several days or longer.

The temperature employed should be at least about 25° C. higher than the temperature at which the body has previously been treated in an alloy-diffusion process, and it should be below the melting point of the body. For example, indium is commonly fused to a germanium body at about 500° C. to form a P–N rectifying junction; therefore, after removal of the non-diffused indium from its surface the germanium body may be heated at any temperature from about 525° C. to about 900° C. to provide a thickened junction according to the invention.

The practice of the invention is also especially suitable for removing excess metal used in alloying-diffusion work whenever it is desired to examine the alloy front or the recrystallization effect along the alloy front.

There have thus been described improved semi-conductor devices and methods for making them, which devices have thickened P–N rectifying junctions and are, therefore, especially suitable for operation at relatively high electrical voltages and frequencies.

What is claimed is:

1. A method for making a semi-conductor device comprising intimately joining a metal selected from the group consisting of indium, gallium, bismuth, silver, gold, zinc, and copper to a surface of a semi-conducting body selected from the group consisting of germanium and silicon to form a P–N rectifying junction in said body by alloying of a portion of said metal into said body, and removing substantially all other portions of said metal from said body by dissolving said metal in mercury.

2. The method of making a semi-conductor device comprising intimately joining indium to a surface of a semi-conducting germanium body by alloying a portion of said indium into said body and removing substantially all other portions of said indium from said body by dissolving said indium in mercury.

3. A method for making a semi-conductor device comprising intimately joining a metal selected from the group consisting of indium, gallium, bismuth, silver, gold, zinc, and copper to a surface of a semi-conducting body selected from the group consisting of germanium and silicon to form a P–N rectifying junction in said body by the diffusion of a portion of said metal into said body, removing by solution in mercury substantially all other portions of said metal from said body, and heating said body to thicken said junction.

4. The method according to claim 3 in which said metal is indium and said semi-conducting body consists essentially of germanium.

5. The method according to claim 4 in which said heating is carried out in a non-oxidizing atmosphere at 525° C. to 900° C. for at least 10 minutes.

6. The method according to claim 3 in which electrical leads are connected to said body.

7. In the manufacture of semi-conductor devices by a method which includes the steps of forming a P–N junction in a body of semi-conductive material of one conductivity type, by alloying into a surface thereof a metal capable of imparting opposite conductivity characteristics thereto, the improvement comprising dissolving said metal from the surface of said body, and leaving exposed a surface of the rcerystallized region constituted by that portion of said body into which said metal has alloyed and diffused.

8. A method for making a semi-conductor device comprising alloying a metal selected from the group consisting of indium, gallium, bismuth, silver, gold, zinc and copper into a surface of a semi-conducting body selected from the group consisting of germanium and silicon to form a P–N rectifying junction in said body by the penetration of a portion of said metal into said body, removing portions of said metal other than said penetrated portions from said body, and heating said body to thicken said junction.

References Cited in the file of this patent

UNITED STATES PATENTS

| | | |
|---|---|---|
| 2,597,028 | Pfann | May 20, 1952 |
| 2,623,102 | Shockley | Dec. 23, 1952 |
| 2,694,024 | Bond et al. | Nov. 9, 1954 |
| 2,725,315 | Fuller | Nov. 29, 1955 |
| 2,727,839 | Sparks | Dec. 20, 1955 |
| 2,735,050 | Armstrong | Feb. 14, 1956 |
| 2,742,383 | Barnes et al. | Apr. 17, 1956 |